United States Patent [19]

Furtner et al.

[11] Patent Number: 4,817,467
[45] Date of Patent: Apr. 4, 1989

[54] TRANSMISSION WITH DUAL MODULATED SHIFT CONTROLS

[75] Inventors: Horst Furtner, Kressbronn; Eugen Gerteiser, Eriskirch; Georg Gierer, Kressbronn, all of Fed. Rep. of Germany

[73] Assignee: Zahnradfabrik Friedrichshafen, AG., Friedrichshafen, Fed. Rep. of Germany

[21] Appl. No.: 2,698

[22] PCT Filed: Apr. 19, 1986

[86] PCT No.: PCT/EP86/00237

§ 371 Date: Jan. 5, 1987

§ 102(e) Date: Jan. 5, 1987

[87] PCT Pub. No.: WO86/06809

PCT Pub. Date: Nov. 20, 1986

[51] Int. Cl.$^4$ ............................................... B60K 41/16
[52] U.S. Cl. ...................................... 74/864; 74/863
[58] Field of Search ............... 74/877, 864, 863, 862, 74/859, 857

[56] References Cited

U.S. PATENT DOCUMENTS

| | | | |
|---|---|---|---|
| 3,646,836 | 3/1972 | Kubo et al. | 74/864 |
| 3,688,606 | 9/1972 | Lemieux et al. | 74/863 |
| 3,768,339 | 10/1973 | Kolehmainen et al. | 74/864 |
| 4,005,620 | 2/1977 | Dach et al. | 74/865 |
| 4,161,894 | 7/1979 | Giacosa | 74/863 |
| 4,263,826 | 4/1981 | Hartz et al. | 74/869 X |
| 4,367,662 | 1/1983 | Greene | 74/863 |
| 4,553,389 | 11/1985 | Tischer et al. | 60/384 |
| 4,558,631 | 12/1985 | Fassbender | 91/516 |
| 4,612,826 | 9/1986 | Greene | 74/863 |
| 4,679,466 | 7/1986 | Kumura et al. | 74/863 |

OTHER PUBLICATIONS

"Das Neue Automatische Pesonenwagen–Getriebe 3 HP-22 der ZF", published by Zahnradfabrik Friedrichshafen AG, W. Germany.

Primary Examiner—Dirk Wright
Assistant Examiner—Harold F. Macris
Attorney, Agent, or Firm—Albert M. Zalkind

[57] ABSTRACT

A vehicle driven by a super charged engine has a gear transmission that is automatically shifted between drive ratios under the joint control of vehicle speed and engine load demand, modified by a loading signal pressure derived from the engine carburetor to correctively influence the change in drive ratio so as to accommodate a super charged type of engine. Such loading signal pressure is applied to a shift valve of the transmission control system independently of control pressure reflecting vehicle speed and engine load demand in order to correctively modify the pressure control exercised during the drive ratio change interval.

7 Claims, 5 Drawing Sheets

TRANSMISSION WITH DUAL MODULATED SHIFT CONTROLS

BACKGROUND OF THE INVENTION

This invention relates to a hyraulic control system for a vehicle having an automatic gear transmission in which changes in drive ratio are controlled jointly by load demand on a super charged vehicle engine and vehicle speed.

A hydraulic transmission control system comparable to that of the present invention is already known wherein the drive ratio shift points are predetermined by engine load and vehicle speed. A throttle pressure valve connected in series with a main pressure valve to the engine driven pump produces an operating pressure as a function of engine load independently of the position of the drive ratio selection lever of the transmission. A cam angularly displaced by a pull exerted on a cable to a position corresponding to that of the fuel or gas pedal, causes piston displacement in the throttle pressure valve thereby prestressing a valve seating spring in accordance with engine load to produce a throttle pressure. A modulation valve connected in parallel with the throttle pressure valve to the pump through the main pressure valve in series therewith is also biased to a seated position and is subjected to the operating pressure as well as the throttle pressure. The operating pressure is derived from the pump through a main pressure valve. The modulation pressure output of such modulation valve in most cases is greater than the throttle pressure, in accordance with the ratios of the valve and piston pressure surfaces and the changes in the operating pressure as a function of the engine load, to influence drive ratio change or shift and determine the pressure in the servo pistons during the drive ratio shifting process.

The pressure dependent on vehicle speed of travel, is produced by a governor valve on the driven transmission shaft and lockout valves which prevent downshift from speed ratios corresponding to the positions of the aforementioned drive ratio selection lever. Furthermore, upshift to speed ratios above such selected speed ratios are also prevented.

Hydraulic control systems associated with the foregoing type of automatic gear transmission have proven to be practical with all engines developing suction pressure for the determination of drive ratio switching points and operation of control elements in dependence on engine load and speed of travel by means of the throttle pressure valve and the regulator valve. In such transmissions, engagement and disengagement of drive establishing couplings and brakes are effected without discomfort to the driver and the passengers of the vehicle.

In the case of vehicles driven by a super charged engine, the foregoing control operations of the automatic transmission are not satisfactory because engine torque is not alone reflected by the position of the fuel control gas lever or pedal. It is therefore an important object of this invention to provie a hydraulic control system for gear transmissions which may also be used for transmissions driven by super charged engines with minimum structural or control modification.

SUMMARY OF THE INVENTION

In accordance with the present invention, a vehicle gear transmission is shifted automatically by means of fluid pressure operated shift valves of a hydraulic control system in order to engage or disengage couplings and brakes by means of fluid under an operating pressure. The points at which the shift valves effect changes in drive ratio and the operating pressure are predetermined in accordance with the engine load reflected by the position of the fuel control pedal and the vehicle speed by means of corresponding throttle and governor pressures applied to the shift valves. The gear transmission is driven by a super-charged engine having a fuel carburetor from which a loading signal pressure is applied to at least one of the shift valves of the hydraulic control system.

The loading signal pressure applied to said one of the drive ratio shift valves influences operation thereof by means of an operating pressure maintained at a sufficient level during the shifting interval, involving release of a coupling or brake in the case of a down shifting operation. One or several pistons of the down-shift valve, which operates as a pressure modulator, is influenced by a governor pressure dependent on vehicle speed and/or a spring bias corresponding thereto. The level of the operating pressure during the shifting operation is additionally influenced by the loading signal pressure from the carburetor for a more realistic adaptation of engagement pressure since the torque of the engine may be variable prior to and during the shifting operation in accordance with engine speed and the position of the throttle valve disc of the carburetor to which the fuel control pedal or lever is connected.

Whenever the loading signal pressure is conducted directly to the spring space of a conventional pressure control valve utilized in the system of the present invention without modification, a relatively simple construction is involved because no pressure elements are required for pressure modulation purposes. The fluid sealing problems associated with such valves may be solved in a simple manner by the arrangement of relatively long sealing surfaces or cuffs in accordance with certain embodiments of the invention.

BRIEF DESCRIPTION OF THE DRAWING FIGURES

FIG. 2 is a graphical illustration of certain characterics or parameters associated with the control system during transition between different drive ratios.

DETAILED DESCRIPTION OF PREFERRED EMBODIMENTS

Figure 1:
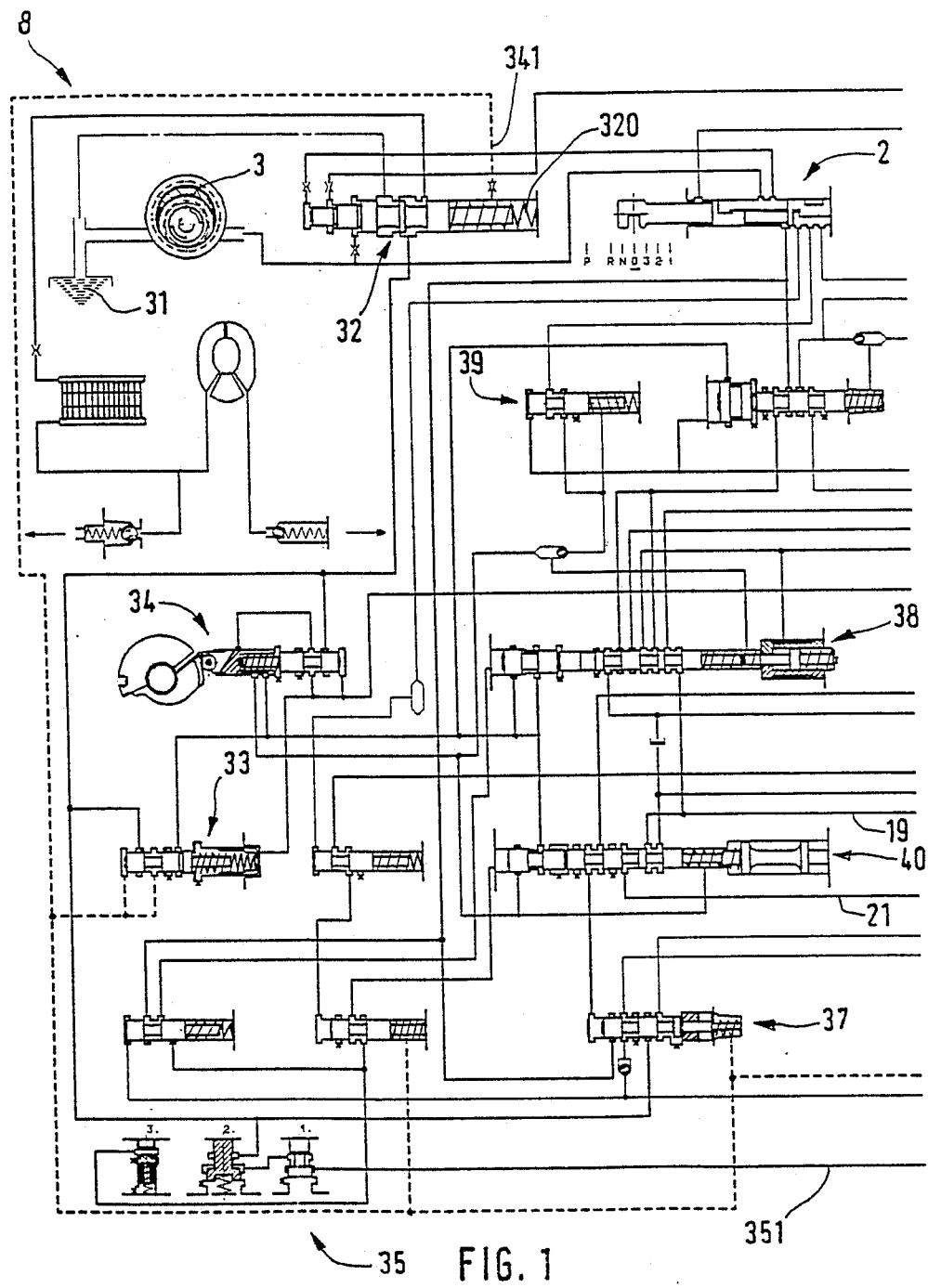
FIGS. 1 and 2 are fluid circuit diagrams corresponding to the control system of the present invention.
Figure 1A:
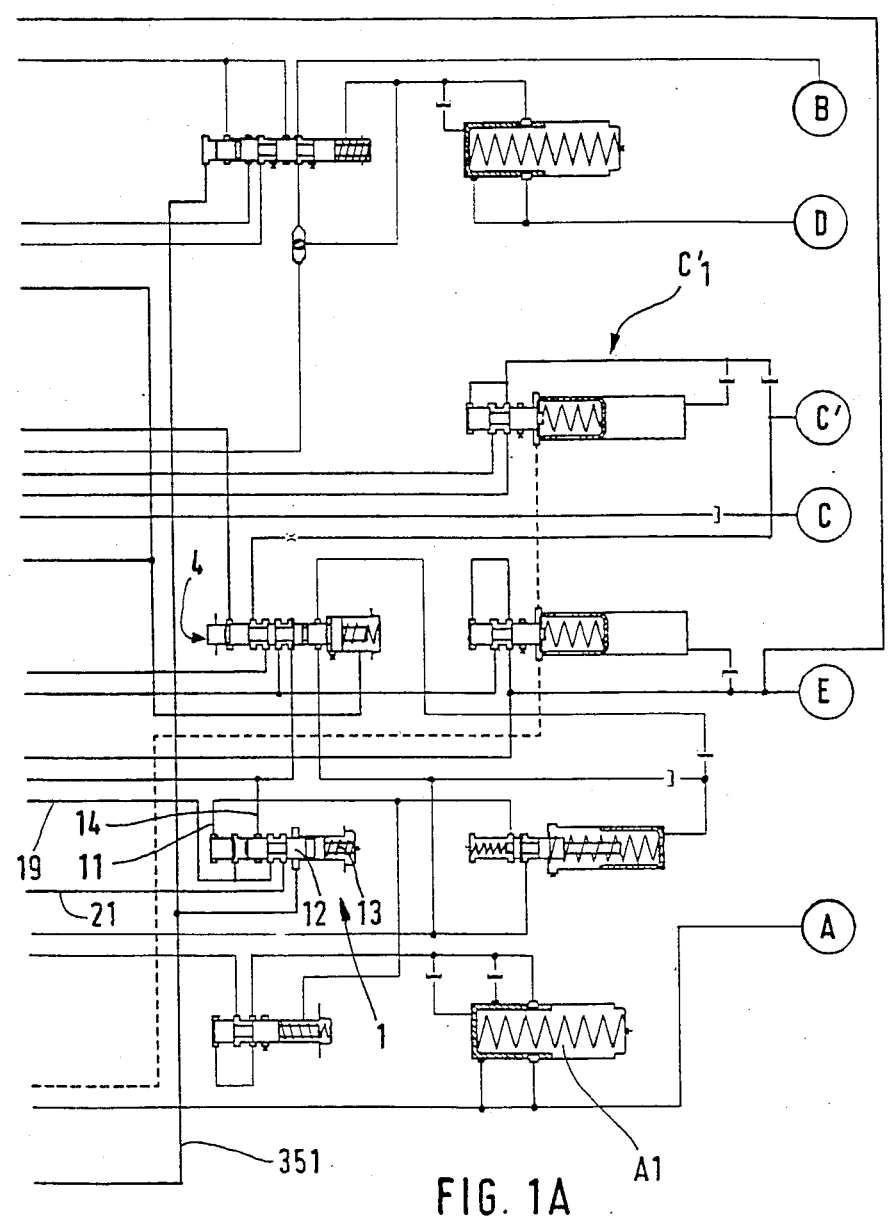

The fluid circuit control diagram of FIG. 1 depicts a drive ratio selection slide valve 2 in a position D which corresponds to unrestricted automatic drive operation. Operating pressure is generated by an engine driven pump 3 which draws oil or fluid under suction pressure from a sump 31 of the transmission and conveys it to a main pressure valve 32. The valve 32 operates as a modulation valve in a manner already well known in the art. Thus, the output pressure of valve 32 depends on the bias of its spring 320 and on a shift control pressure of fluid in throttle pressure line 341. Such shift control pressure to valve 32 is supplied through a throttle valve 34 and a modulation valve 33 in dependence on the position of the fuel control pedal or lever in a manner generally known in the art. In drive ratio speed positions 1,2,3 of the valve 2, modulated pump pressure is fed from valve 32 to a 4/3 down-shift valve 1 by means of valves 36 and 37 respectively shown in FIGS. 1A and 1 and fluid conduit 11 as shown in FIG. 1A so that the pistons 12 of the down-shift valve are shifted in oposition to the bias of spring 13 toward a right end position. Thus, the 4/3 down-shift valve 1 is prevented from being displaced in a lefthand direction in the 1-3 drive ratio speed positions of selector valve 2. In the fourth drive ratio speed position of valve 2, the main pressure is fed from valve 32 exclusively through conduit 14 shown in FIG. 1A. and valves 2, 4 and 39 to the 4/3 down-shift valve. A speed dependent pressure is produced through the governor valve 35 which may likewise be fed to the down shift valve through conduit 351. A drive ratio control brake C' is released during the down shifting operation from the fourth to the third speed ratio. In addition to a damper valve C'1, a coupling valve 38 as shown in FIG. 1 is assigned to the control brake C' while a damper valve A1 is assigned to the coupling A for operational control. Fluid operating pressure is supplied to the control brake C' from the shift valve 1 through conduit 19, said coupling valve 38 and said damper valve C'1 as shown in FIGS. 1 and 1A to control engagement of brake C'. The release of brake C' in response to downshift of valve 1, as aforementioned, is occassioned by displacement of the valve element 12 of the shift valve to control the connection of the operating pressure conduit 19 to sump through conduit 21 under control of valve 40 as also shown in FIGS. 1 and 1A.

Figure 2:
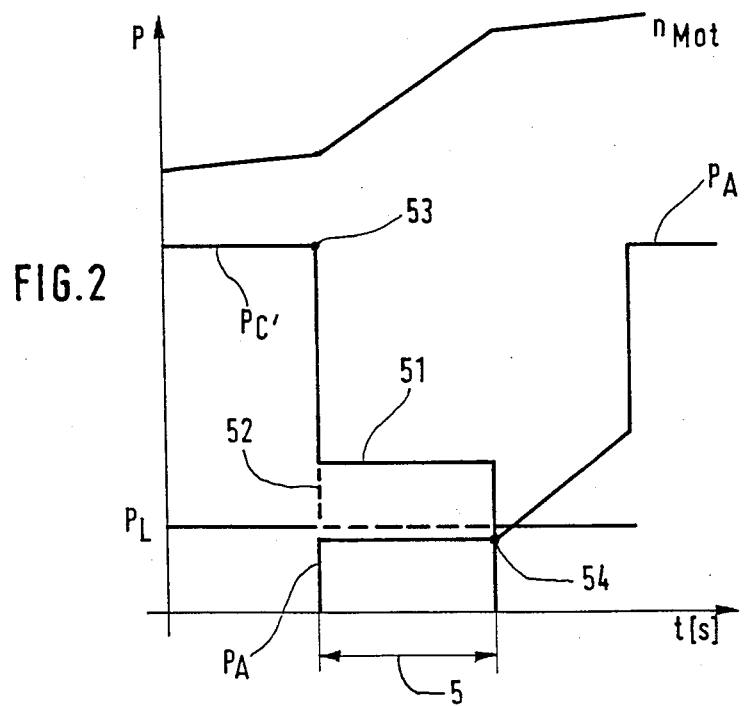

FIG. 2 diagrammatically illustrates certain variables during down shift from the fourth to the third drive ratio speed in accordance with the present invention. PC' represents in FIG. 2 the pressure applied to the brake C' while being released and PA represents the pressure applied to the coupling A while being engaged. The transition delay interval during which the brake C' is disengaged and the coupling A is engaged, is denoted by reference numeral 5 in FIG. 2 as the period of time during which the change in drive ratio occurs. The curve PL represents the loading signal pressure.

The change in drive ratio from the fourth to the third speed, occurs as follows with reference to FIG. 2:

Down shift from the fourth to the third speed drive ratio is triggered during drive of the vehicle at a predetermined speed in response to kick down displacement of the gas fuel pedal to the full throttle position. As a result, the pressure in brake C' drops as shown by curve PC' while the pressure in coupling A is built up as shown by curve PA in order to effect engagement of coupling A. During the interval 5, the curve PC' follows the dotted line path 52 as shown in FIG. 2 without influencing the loading signal pressure depicted by curve 51, in a simplified fashion as a straight horizontal line, although it may assume any shape corresponding to the actual loading condition. At point 53 on curve PC', the engine torque is transferred exclusively by engagement of the brake C' and beginning with point 54 by engagement of the coupling A. Between points 53 and 54 during the interval 5, the transfer of torque is effected by continued engagement of the brake C'. As a result of the application of the loading signal pressure during pressure modulation by the 4/3 down shift valve 1, to reduce the operating pressure of the brake C' being disengaged as explained in detail hereinafter, a more realistic adaptation of brake engagement pressure is effected for transmission of torque from a super charged engine because of the more direct influence of its carburetor. Such operational modification does not occur with respect to pressure modulation under control of the fuel pedal position alone and the bias of spring 13 in the down shift valve 1.

Figure 3:
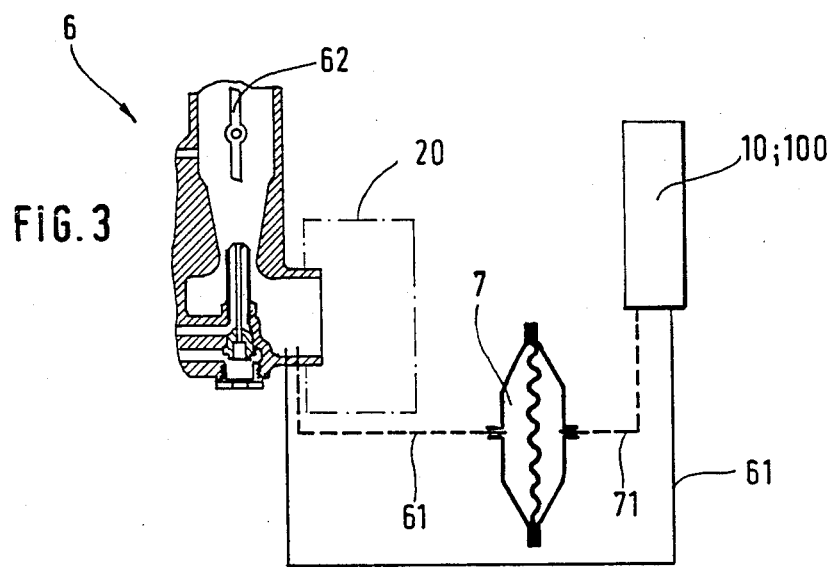
FIG. 3 is a simplified fluid control diagram corresponding to that of FIG. 1 in connection with the loading signal pressure supply.
Figure 4:
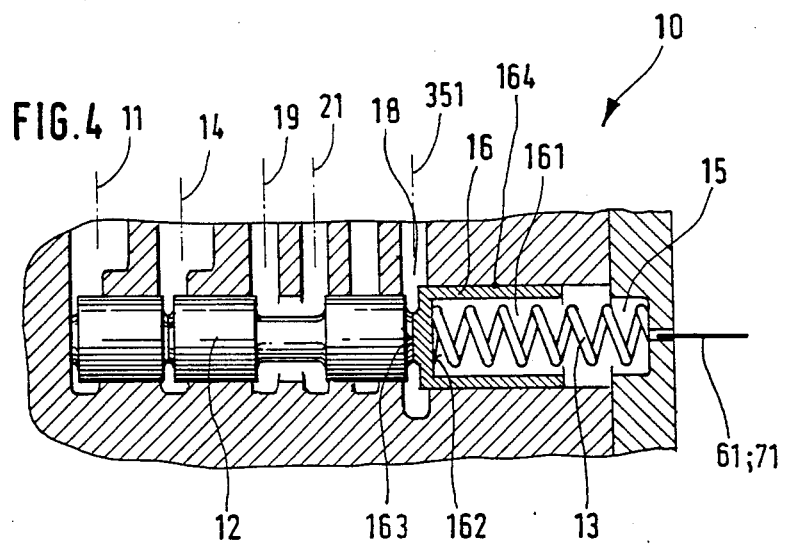
FIG. 4 is a side section view through a down-shift valve in accordance with one embodiment of the present invention.

FIG. 3 illustrates schematically a carburator 6 as the fuel feeding control associated with the super charged engine in accordance with certain specific embodiments of the present invention, having a pressure box 7 and a 4/3 down shift valve 10 or 100 constituting modifications of the down shift valve 1 hereinbefore described with respect to FIGS. 1 and 1A. Loading signal pressure from the carburetor 6 in line 61 may be fed directly to the down shift valve or indirectly through pressure box 7 and hydraulic pressure line 71. One of the embodiments of the down-shift valve, shown in FIG. 4 and referred to by reference numeral 10, has a sealing element 16 and a spring space 15 to which the loading signal pressure is directly fed by line 61 or 71. A relatively large sealing surface 164 seals the spring space 15 receiving the loading signal pressure acting in opposition to hydraulic pressure in piston spaces 18 of the down-shift valve 10. The loading signal pressure thus acts on the inside bottom surface 162 of the pot shaped sealing body 16 within which the spring 13 is housed to reduce the operating pressure applied to brake C' during disengagement thereof as aforementioned. The outside bottom surface 163 of the sealing body 16 abuts the piston 12.

Figure 5:
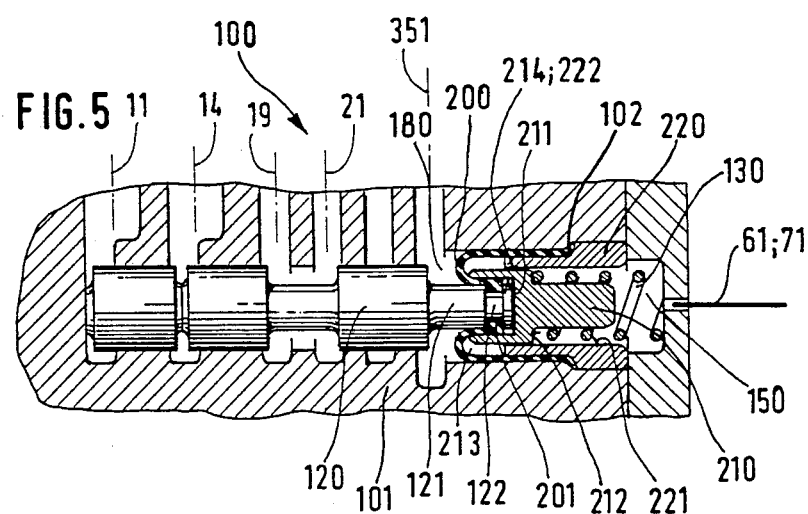
FIG. 5 is a side section view through a down-shift valve in accordance with another embodiment of the invention.
Figure 6:
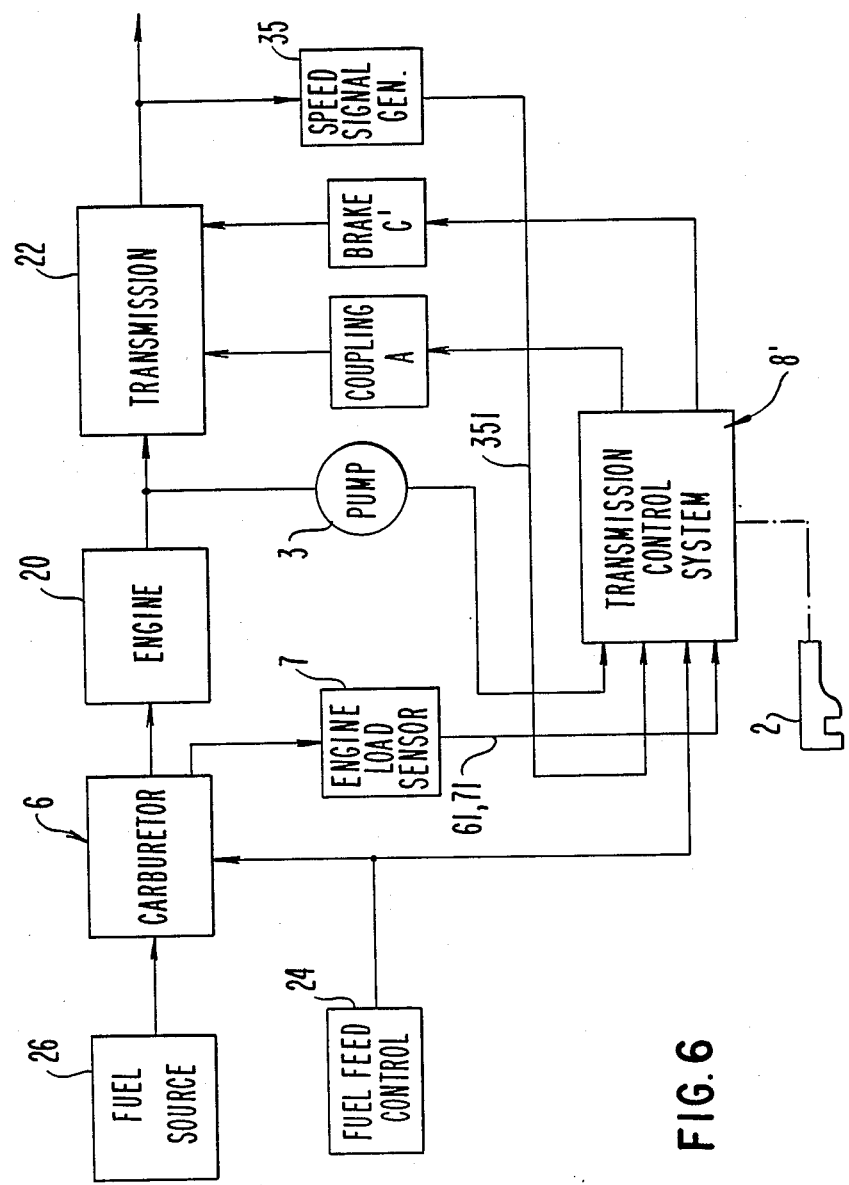
FIG. 6 is a schematic block diagram corresponding to the fluid circuit diagram of FIGS. 1 and 1A.

Another sealing arrangement for the down-shift valve is shown in FIG. 5 with respect to an embodiment referred to by reference numeral 100. A groove 122 is formed in a shaft 121 of a piston 122 to receive a beaded annular end 201 of a thin-walled cuff 200. The beaded end 201 is held in groove 122 by a holding body 210. The cuff is fastened to the valve body 101 with the help of a clamping element 220 so that the spring space 150 is effectively sealed from the piston spaces 180. The holding body 210 is also axially biased by the spring 130 to act in concert with longitudinal movement of the piston 120 for pressure modulation purposes. The clamping element 220, on the other hand, is attached to the valve housing body 101. In view of the complete sealing action of the cuff 200, the slide bearing surfaces 213/221 between the clamping element 220 and the holding body 210 or gap 214/222 readily accommodates modulation movement of the piston 120 in a substantially frictionless manner.

We claim:

1. In combination with a vehicle having a super charged engine with a fuel feed control, a transmission driven by the engine and a control system for automatic shift of the transmission between drive ratios through at least two drive establishing devices (A, C') engaged under a control pressure modulated as a function of vehicle speed and a function of engine load demand reflected by fuel feed control position, said control system including a shift valve (10, 100) to which said control pressure is fed during said shift between said drive ratios, the improvement comprising signal pressure means operatively connected to the engine for providing a loading signal pressure (PL) and means (61, 71) directly connecting the signal pressure means to the shift valve (10, 100) for supply thereto of the loading signal pressure separately from the control pressure to correctively influence operation of the shift valve as a function of engine load demand.

2. The combination of claim 1 wherein said signal pressure means comprises a conduit (61) directly connected to the shift valve.

3. The combination of claim 1 where in said signal pressure means includes a pressure signal converting device (7).

4. The combination of claim 1 wherein the transmission includes means connected to the shift valve (10, 100) for controlling engagement and release of the drive ratio establishing devices under said control pressure (PC) during a drive ratio shift interval (5), said shift valve including a valve body, a valve element (12, 120) displaceable within the valve body by opposed signal pressures applied thereto by the control system, a spring (13, 130) biasing the valve element in a direction augmenting one of the opposed signal pressures, a pressure sealed chamber (15, 150) to which the loading signal pressure is applied by the operative connecting means and within which the spring is enclosed, and control pressure modifying means (16, 200-210) through which the bias of the spring and the loading signal pressure are applied to the valve element for maintaining the control pressure at a level (51) above and dependent on said loading signal pressure (PL) during the drive ratio shift interval (5).

5. The combination of claim 4 wherein said control pressure modifying means comprises a hollow piston (16) in sealed relation to said pressure sealed chamber (5) and having an internal space (15) into which the spring (13) projects and an end wall (162) against which the spring abuts, said end wall having a pressure surface (163) abutting the valve element (12) within a pressure space of the valve body to which the loading signal pressure (PL) is applied by the operative connecting means (61).

6. The combination of claim 4 wherein the said control pressure modifying means comprises a flexible tubular diaphram (200) means (220) clamping the flexible tubular diaphram to the valve body (101) within the pressure sealed chamber (150) in sealing relation thereto, holding means (210) clamping the flexible diaphram to the valve element (120) for exposure to a pressure space within the valve body to which the loading signal pressure is applied, the holding means having a shoulder (212) against which the spring (130) abuts to transmit the bias thereof to the valve element.

7. In a transmission having fluid operated means for establishing low and high ratio drives, a source of fluid under pressure (3); governor means (35) providing a speed signal proportional to transmission speed; torque demand means (34) providing a torque demand signal; means (6) providing a torque loading signal; automatic control means operatively connected to said source, said fluid operated means, said governor means and said torque demand means and arranged to connect said source of fluid under pressure to said fluid operated means to establish said low and high drives and shift between said drives during a predetermined shift interval (5) in response to said speed signal and said torque demand signal; said automatic control means including a shift valve; signal transmitting means (61, 7, 71) connected to the torque loading signal means for providing a loading pressure (PL) concurrent with and proportional to said torque loading signal directly to the shift valve; and boost pressure modifying means (16, 200-210) connected to said shift valve and operative therethrough for controlling engagement of the fluid operated means in said low and high drives concurrent with and in proportion to said loading pressure during said shift interval.

* * * * *